(12) United States Patent
Sardo

(10) Patent No.: US 8,222,506 B1
(45) Date of Patent: Jul. 17, 2012

(54) HARMONICA TEACHING SYSTEM

(76) Inventor: Philip Sardo, Sherman Oaks, CA (US)

( * ) Notice: Subject to any disclaimer, the term of this patent is extended or adjusted under 35 U.S.C. 154(b) by 0 days.

(21) Appl. No.: 13/225,828

(22) Filed: Sep. 6, 2011

(51) Int. Cl.
*G09B 15/00* (2006.01)

(52) U.S. Cl. ........................................ 84/470 R; 84/377

(58) Field of Classification Search ............ 84/377–379, 84/470 R, 475, 477 R, 485 R, 483.1, 483.2
See application file for complete search history.

(56) References Cited

U.S. PATENT DOCUMENTS

| | | | |
|---|---|---|---|
| 2,276,501 | A | 3/1942 | Manieri |
| 4,402,249 | A | 9/1983 | Zankman |
| 5,309,812 | A | 5/1994 | Shelton |
| 5,585,583 | A | 12/1996 | Owen |
| 6,870,085 | B2 | 3/2005 | MacCutcheon |
| 2002/0117043 | A1* | 8/2002 | Powley ......................... 84/483.2 |
| 2010/0077906 | A1 | 4/2010 | Hagstrom |

\* cited by examiner

*Primary Examiner* — Kimberly Lockett
(74) *Attorney, Agent, or Firm* — Goldstein Law Offices, P.C.

(57) ABSTRACT

A multimedia system for teaching how to play a harmonica and other musical instruments that graphically indicates a note to be sounded by using a letter symbol pointing to a hole on the harmonica. The symbol graphically indicates when to blow, when to draw, when to hold the note and when to use a slide when playing the note by using a plurality of graphical display modes and sounding the note in a correct manner. The system graphically cues a next note by displaying an indicator over the hole for the next note while pointing with the symbol to the currently played note. A display scrolls a plurality of tablature for the melody. The system runs on a cross-channel multimedia player on a plurality of operating systems that allows a sequence of notes to be selectively looped repeatedly, speeding up or slowing down the playing of a note sequence.

21 Claims, 14 Drawing Sheets

HARMONICA TEACHING SYSTEM

BACKGROUND OF THE INVENTION

The invention relates generally to a system and a method for teaching how to play a harmonica. More particularly, the invention relates to a multimedia system and a method for introducing and teaching basic techniques and songs for playing the harmonica.

Many people enjoy playing a musical instrument for their own pleasure and the entertainment of their friends and relatives. These people do not aspire to be professional musicians, but only desire achieving a level of skill in playing the instrument, producing sounds that are welcomed by those who hear them. The amateur wants to learn a simple instrument and does not want to invest in many hours or great expense studying with a professional music teacher.

A harmonica is a reed instrument used in many styles of music such as blues, folk, jazz, county and even rock and roll music. The harmonica is a good choice for the amateur to learn, lending itself to self-instruction, relatively inexpensive and easy to master, providing a wide repertoire of songs from which to choose.

The harmonica has a plurality of reed chambers, each having a hole and multiple reeds. The harmonica is played by placing a pair of lips over at least one hole and blowing air or drawing air through the hole, causing the reeds to vibrate, producing two different notes from the same hole by either blowing or drawing air.

While there are many types of harmonicas, two popular styles are the chromatic and the diatonic. The diatonic is the basic one harmonic key harmonica having holes opening the reed chambers, each reed chamber have a plurality of reeds. The chromatic harmonic uses a button-activated sliding bar to redirect air from the hole in the mouthpiece to the selected reed desired. When the button is not pressed, an altered diatonic major scale of the key of the harmonica is available, while depressing the button accesses the same scale a semitone higher in each hole.

Learning to play an instrument, whether it is one that is relatively simple such as the harmonica or complex, such as the piano, involves repetition and drills, practice and challenges. There have been many methods of self-instruction proposed, both for learning to play the harmonica or musical instruments in general. Zankman in U.S. Pat. No. 4,402,249 discloses a printed card displaying a matrix of notes, each column above a hole of the harmonica, mounted on holder in front of the instrument before the eyes of the player. It shows the player which hole or holes to blow or draw through, following down the rows. The player must keep track of which row is being used without any aids and can easily lose the place. No instruction about the length of a note is provided. The method does provide any sound for the player to hear to determine if player is properly producing the note by comparison.

Similarly, Shelton discloses in U.S. Pat. No. 5,309,812 a set of color-coded blocks representing chords printed on a flexible sheet attaching to the harmonica to be used as a mnemonic reference. Similarly, tempo and persistence of a note are not provided, nor is any sound for the player to hear for comparing the note being sounded by the player to a correct sound of the note.

Others have proposed systems for self-instruction for instruments generally. MacCutcheon discloses in U.S. Pat. No. 6,870,085 a system using an elaborate system of colors and stylized animal images that are applied to the instrument and the sheet music is annotated to create mnemonic references. Tempo and persistence are not addressed. The method does not provide any sound for the player to hear to determine if player is properly producing the note by comparison.

Owen teaches in U.S. Pat. No. 5,585,583 an audio and visual presentation that combines the musical output of the practice instrument with a computer generated output for comparison but does not anticipate the next note to be played while a current note is sounded.

Hagstrom teaches in U.S. Patent Application Publication 2010/0077906 an audio-visual instruction method for a wind instrument displaying visual indicia of how and when to inhale or exhale. None of these methods give any additional visual or audio clues to the sequence of notes that is easy to follow and none shows how to operate the various components of the instrument in cooperation to produce a desired sound.

While these units may be suitable for the particular purpose employed, or for general use, they would not be as suitable for the purposes of the present invention as disclosed hereafter.

SUMMARY OF THE INVENTION

It is an object of the invention to produce a multimedia system for teaching how to play a musical instrument. Accordingly, the invention is a multimedia system that demonstrates how to play a harmonica, as an example of a musical instrument.

It is another object of the invention to produce a system for teaching how to play a harmonica that instructs what note to play on a harmonica. Accordingly, the invention is a system that graphically indicates a note to be played by using a letter symbol pointing to the hole of the note on a harmonica and displaying a name of the note below.

It is a further object of the invention to produce a system for teaching how to play a harmonica that instructs how to play a note. Accordingly, the invention is a system that indicates when to blow, when to draw, when to hold a note and when to use a slide when playing a note by using a letter symbol in a plurality of graphical display modes and sounding the note in a correct manner.

It is yet a further object of the invention to produce a system for teaching how to play a harmonica that graphically cues a next note in a sequence. Accordingly, the invention is a system that graphically cues a next note by displaying an indicator over a hole for the next note while pointing with a letter symbol to a currently played note.

It is yet another object of the invention to produce a multimedia system for teaching how to play a harmonica that allows for repeating, drilling and changing a speed of playing. Accordingly, the invention is a multimedia system that runs on a multimedia player that allows a sequence of notes to selectively looped for repeating and drilling and selectively allows a speed of playing the sequence of notes to be increased or decreased.

It is still a further object of the invention to produce a multimedia system for teaching how to play a harmonica that runs on a plurality of operating systems. Accordingly, the invention is a multimedia system that runs on a cross-channel multimedia player on a plurality of operating systems so that a student can learn how to play a harmonica on a selected personal computing device, without regard to the operating system.

The invention is a multimedia system for teaching how to play a harmonica and other musical instruments that graphically indicates a note to be played by using a letter symbol pointing to a hole on the harmonica. The symbol graphically indicates when to blow, when to draw, when to hold the note and when to use a slide when playing the note by using a plurality of graphical display modes and sounding the note in a correct manner. The system graphically cues a next note by displaying an indicator over the hole for the next note while pointing with the symbol to the currently played note. A display scrolls a plurality of tablature lines for the melody. The system runs on a cross-channel multimedia player on a plurality of operating systems that allows a sequence of notes to be selectively looped repeatedly, speeding up or slowing down the playing of a note sequence.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 2A:
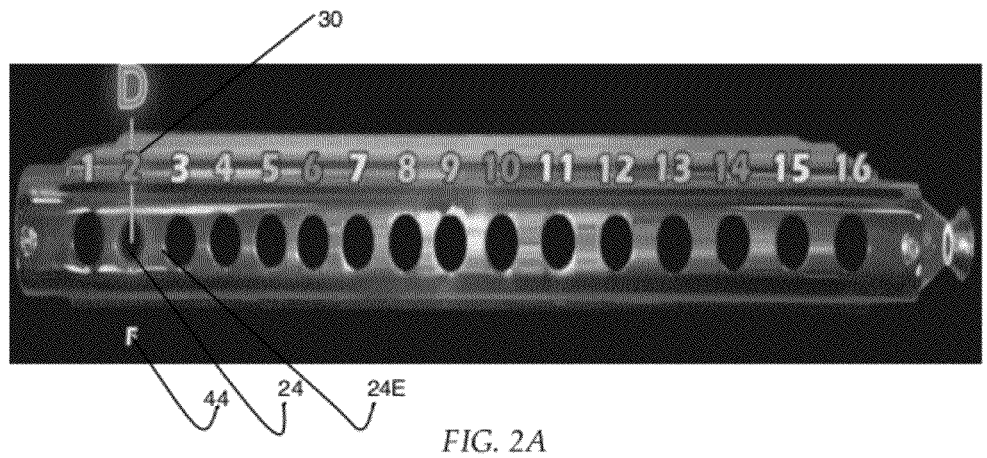
FIG. 2A is an exemplary display of a video screen of the invention indicating by a letter symbol, a hole through which a breath is drawn along with an octave scale name of a corresponding note.
Figure 2B:
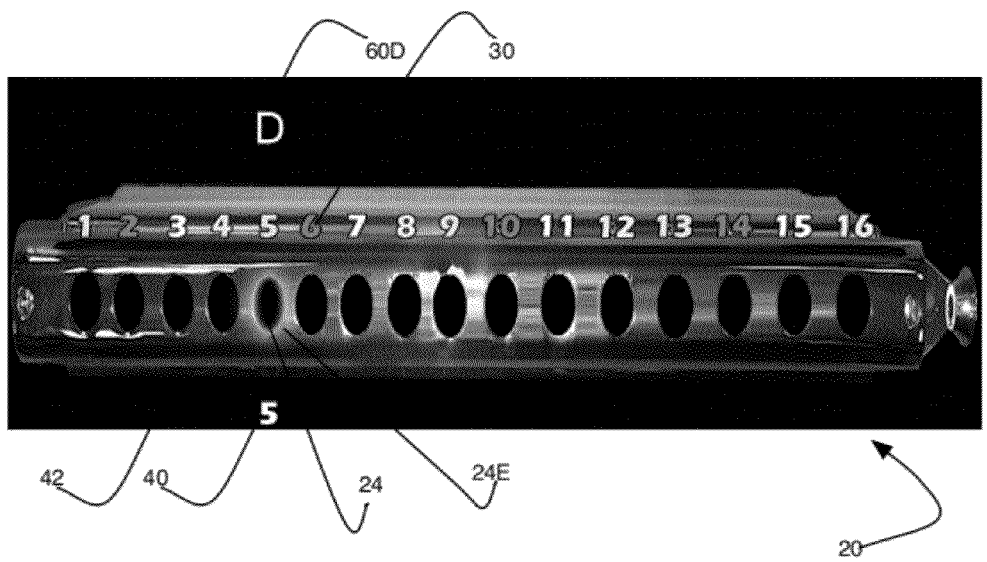
FIG. 2B, similar to FIG. 2A, is an exemplary display of a video screen of the invention indicating by a letter symbol, the hole through which a breath is drawn and the hole number of the note shown on the display line below.

FIG. 2B illustrates an exemplary display of a video display for a system and a method for teaching how to play a musical instrument, using a harmonica 20 as a non-limiting example. The method of teaching relates to a cross-platform multimedia application running in a system that visually and aurally demonstrates basic techniques, notes, melodies and ultimately, songs for playing the harmonica 20. This display shows the harmonica with a plurality of holes 24 that are each labeled with a number label 30. The display introduces a user to a basic technique of playing the harmonica, the technique of drawing a breath through one of the holes on the harmonica. A letter symbol 60D, a "D" as shown in FIG. 2B, is above the number label 30 for the hole 24, indicating that the user draws a breath to produce a note. A number tab 40 on a display line below tells the user which hole is being played. The system sounds the note properly so that the user associates the proper sound with the note that is produced by drawing air over the designated hole.

Figure 1A:
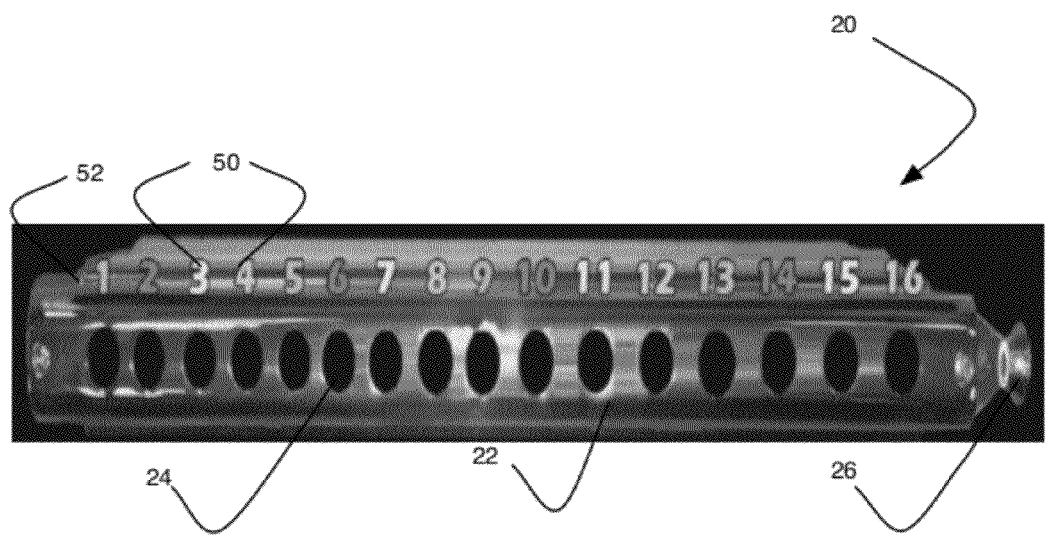
FIG. 1A is an exemplary display of a video screen of the invention showing a chromatic harmonica with a plurality of labeled holes, a label indicating a hole number.

Every musical instrument has a plurality of elements that a user must become familiar with as well as learn a technique to operate the element to make a musical note. In order to instruct a user, the system introduces the user to the harmonica as displayed in the system and as shown in FIG. 1A, associating a plurality of elements to a plurality of symbols, tabs and labels of the method and system. It is well known by those of ordinary skill how the harmonica works; however, definitions for the component parts and basic techniques for playing the harmonica is necessary to understand how the method and the system demonstrate and teach the harmonica to the user. The harmonica 20, as shown in the video screen displays in FIG. 1A through FIG. 6B, is a chromatic harmonica having sixteen (16) holes 24 in a mouthpiece 22 as a non-limiting example. Notes are produced by blowing air or drawing air through the holes 24 in the mouthpiece 22, drawing air through generally producing a note a full tone higher than blowing through the same hole. The chromatic harmonica has an internal slide engaged by a button 26 that selectively restricts and redirects the air flow to produce a different note, generally different by a semi-tone than the note produced without the slide engaged. In addition to showing which hole is used to produce the note, the method teaches the user when the note is blown or drawn and when to engage the slide in order to produce the proper sound. A harmonica without a slide is a diatonic harmonica. It is understood that the method of teaching described hereinbelow on how to select the hole to play and whether air is blown or drawn through the hole applies to, for example, but not limited to, diatonic, chromatic, orchestral, bass and tremolo versions of the instrument and the many variations of the harmonica within those versions as well the variation in the number of holes the instrument has in the mouthpiece, the sixteen-hole chromatic harmonica chosen as a non-limiting example based on its popularity.

Figure 1B:
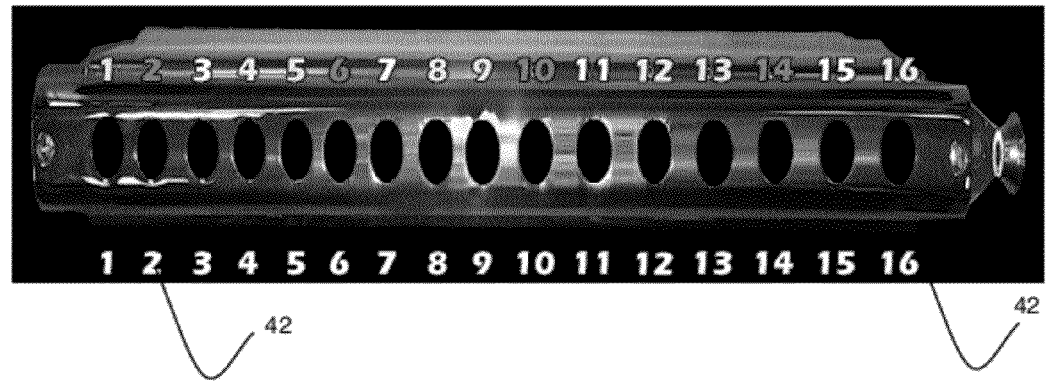
FIG. 1B, similar to FIG. 1A, is an exemplary display of a video screen of the invention showing a chromatic harmonica with a plurality of numbered holes and a display line of labels below the harmonica.

The system presents the image of the harmonica 20 with a label line 52 above the holes, each hole having the number label 50 in the label line 52 above it. The number label corresponds to a system of tabulature notation, which is a method of writing melodies by where the notes are played on the instrument rather than by indicating the notes on a musical staff. The system uses a unique system of tabulature notation for the harmonica as explained hereinbelow. FIG. 1B, similar to FIG. 1A, shows the display line 42 below the harmonica 20. In one embodiment, the display line has a plurality of number tabs 40, the number tabs being a component of the tabulature notation system, a number corresponding to the number label for the hole. FIG. 1B displays all number tabs; however, during operation of the system, only the number of the note or numbers of the notes, as in the instance of playing a chord, being played are displayed. In a further embodiment, the display line shows the note as symbolized by a letter and selectively a sharp or flat symbol in the diatonic notation system.

Referring again to FIG. 2B, the note sounded by the system and to be played by the user is indicated to the user in a plurality of modes. Each hole 24 has a perimeter 24E. When the hole 24 is being played, the perimeter 24E of the hole illuminates and glows. If the number label 30 is displayed in a color, the perimeter 24E glows in a color to match the number label. The number label 30 of the hole being played illuminates and glows. It is understood that the drawings are in black and white, and that the number labels are displayable both in black and white, but are preferably displayable in a plurality of colors. The letter symbol 60D indicating whether to blow or draw, which in this example is a draw or "D," appears above the hole 30 being played. Below the hole, the number tab 40 appears on the display line 42, the display line having only the number tab or number tabs of the note being played in the tabulature notation system.

Figure 2C:
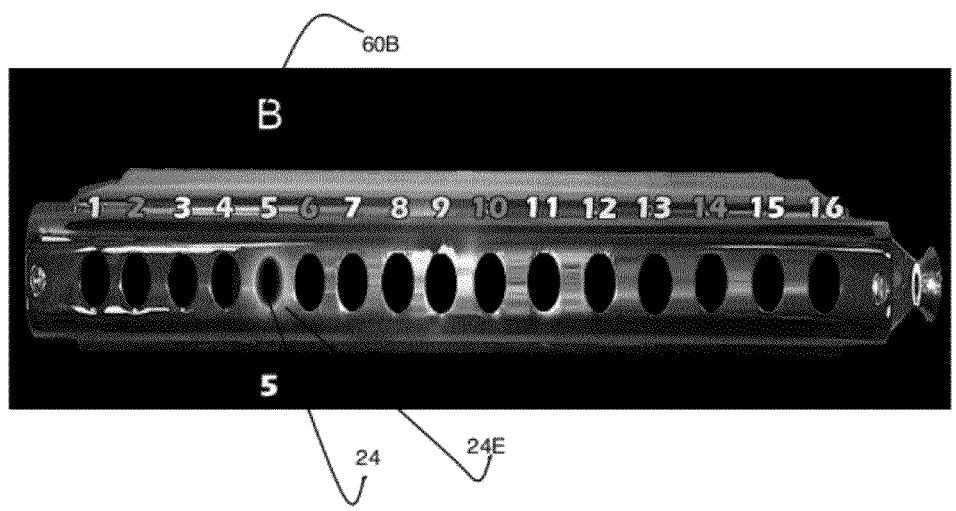
FIG. 2C, similar to FIG. 2B, is an exemplary display of a video screen of the invention indicating by a letter symbol, the hole through which a breath is blown and the hole number of the note shown on the display line below.

FIG. 2C shows the same hole 24 being played as indicated by the glowing perimeter 24E, the number tab 40 on the display line 42 and the brighter number label 30 above the hole 24. However, this note is played by blowing air through the hole as indicated by the "B" letter symbol 60B above the whole, thus producing a note that is a whole tone step different from the note produced by drawing air through the same hole, as demonstrated in FIG. 2B.

FIG. 2A shows a further embodiment of the system and method. The hole is being played as indicated by the glowing perimeter 24E and the brighter number label 30 above the hole 24. In this example, the letter symbol, 60D, also illuminates and glows and is connected by a line 64 to the hole. In the display line, the note is indicated by the name 44 used in the diatonic scale notation system.

Figure 3A:
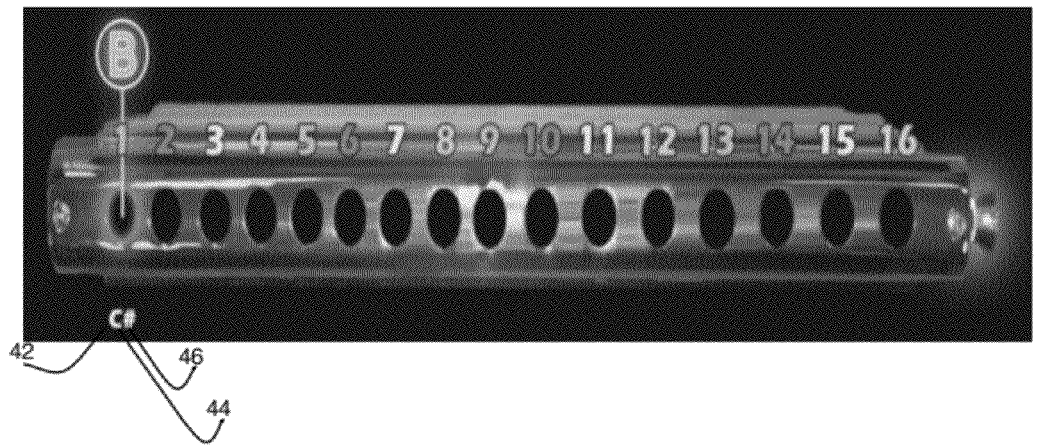
FIG. 3A is an exemplary display of a video screen of the invention indicating by circumscribing the letter symbol to press a button engaging a slide when a hole is played, the display line showing the octave scale name of the corresponding note.
Figure 3B:
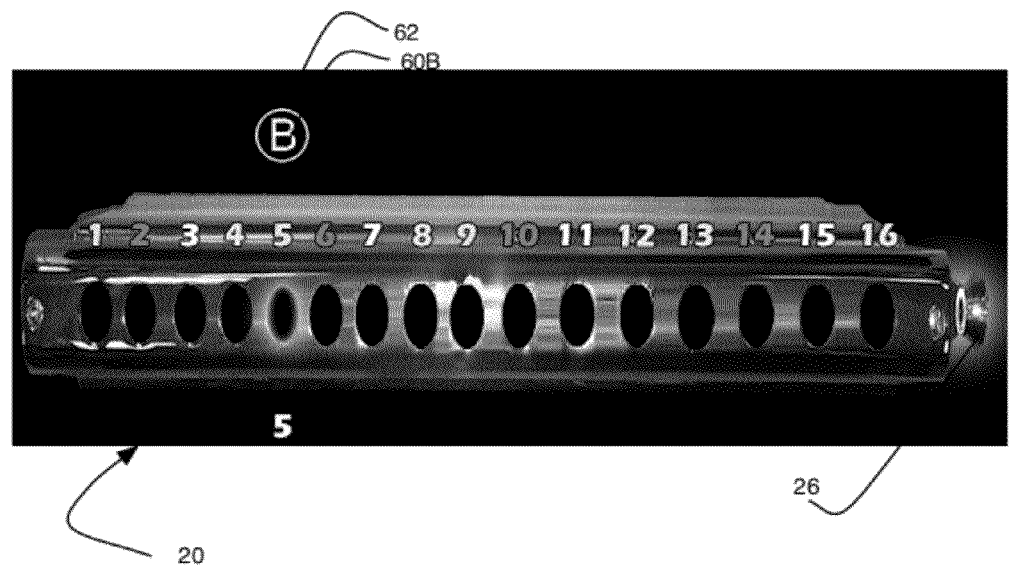
FIG. 3B, similar to FIG. 3A, is an exemplary display of a video screen of the invention indicating by circumscribing the letter symbol to press a button engaging a slide when a hole is played, the display line showing the hole number of the note.

FIG. 3B shows another technique that a user learns when playing the harmonica 20, in particular, the chromatic harmonica and other versions of the harmonica having a slide. The chromatic harmonica shown has the slide that changes the note by a semi-tone that is engaged by pressing the button 26. When the user is to engage the slide when blowing or drawing air, the letter symbol 60B is circumscribed, which is shown in the drawing by circumscribing the "B" with a circle 62. In FIG. 3A, in another embodiment, the semi-tone note is indicated in the display line 42 by the name 44 in the diatonic scale notation, which in this case, includes a sharp symbol 46.

Figure 4A:
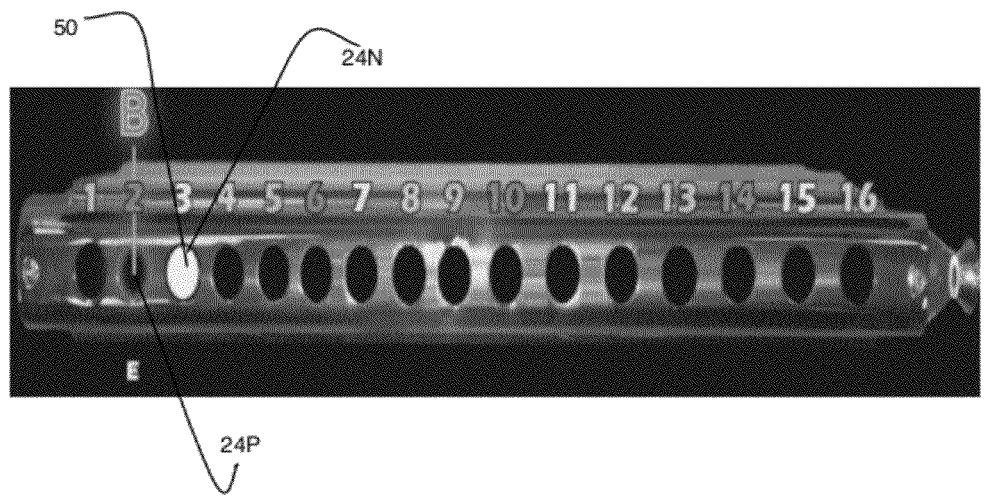
FIG. 4A is an exemplary display of a video screen of the invention indicating a next hole to be played by a white dot indicator.
Figure 4B:
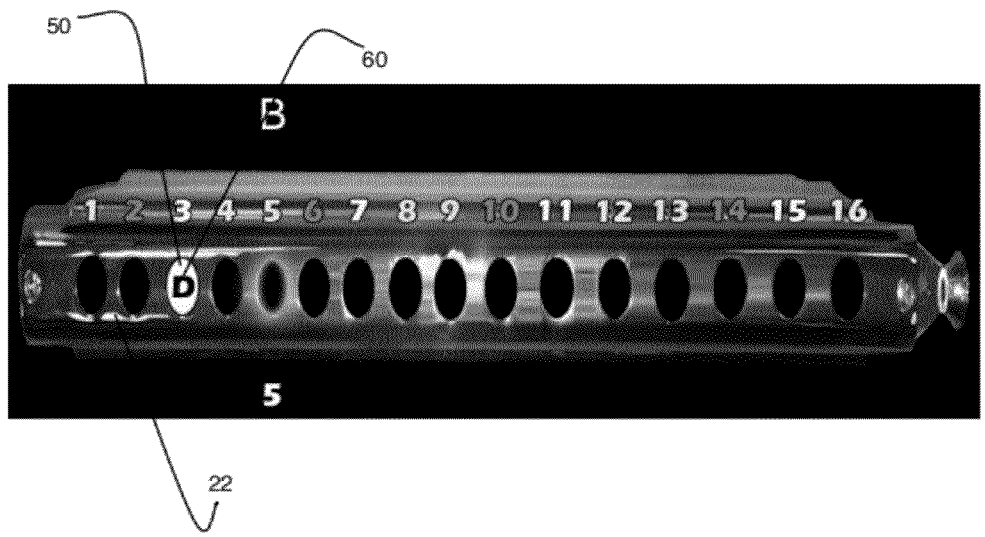
FIG. 4B, similar to FIG. 4A, is an exemplary display of a video screen of the invention indicating a next hole to be played by a white dot indicator with a letter symbol inscribed, showing how the next note is to be played.
Figure 5:
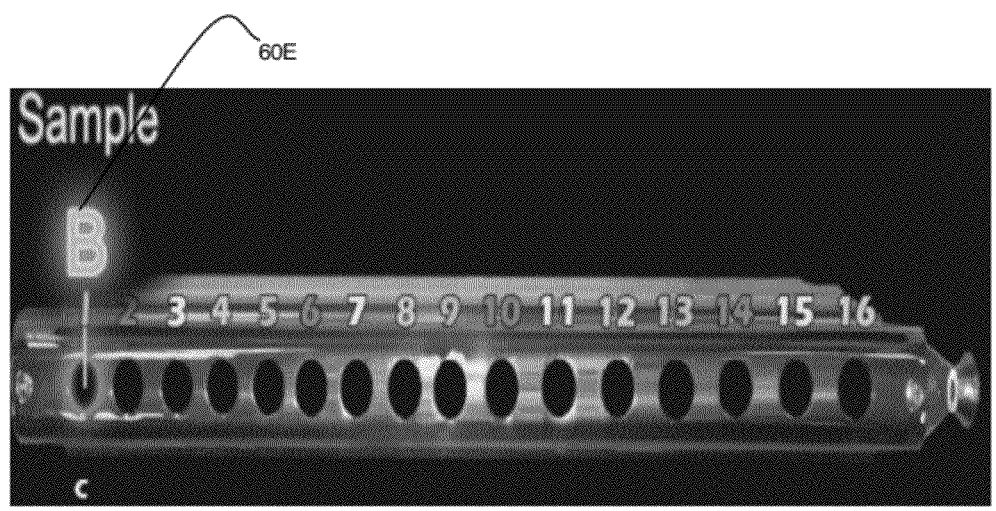
FIG. 5 is an exemplary display of a video screen of the invention in a further embodiment, indicating when a note is to persist by enlarging the letter symbol.

As it is well known, melodies, and hence songs, are played by a sequence of notes, one note following another. Once a user learns the component parts of the harmonica and how to blow and draw air, associating a sound with a hole and whether it is blown or drawn, the user learns how to play the notes in a sequence to create a melody. As shown in FIG. 4A, the system instructs the user which hole 24N is played next by simultaneously showing the hole 24P for the note being played as described hereinabove along with the next note, by placing an opaque white dot indicator 50 over the next hole 24N. In a further embodiment, inscribed inside the dot indicator 50 is the letter symbol 60, indicating whether the next note is blown or drawn, as shown in FIG. 4B. The user can anticipate how to move the mouthpiece 22 for the next note and be prepared to either blow or draw. By anticipating the next note, the user can determine when to take a breath between notes and learn how to control the breath. The ability to see the next note in terms of position and breath control aids the user to learn a sequence. The user does not need to worry about losing a place in sheet music because the system displays the current note as it is being sounded and the next note and continues with an upcoming next note as each next note is currently sounded.

Figure 6A:
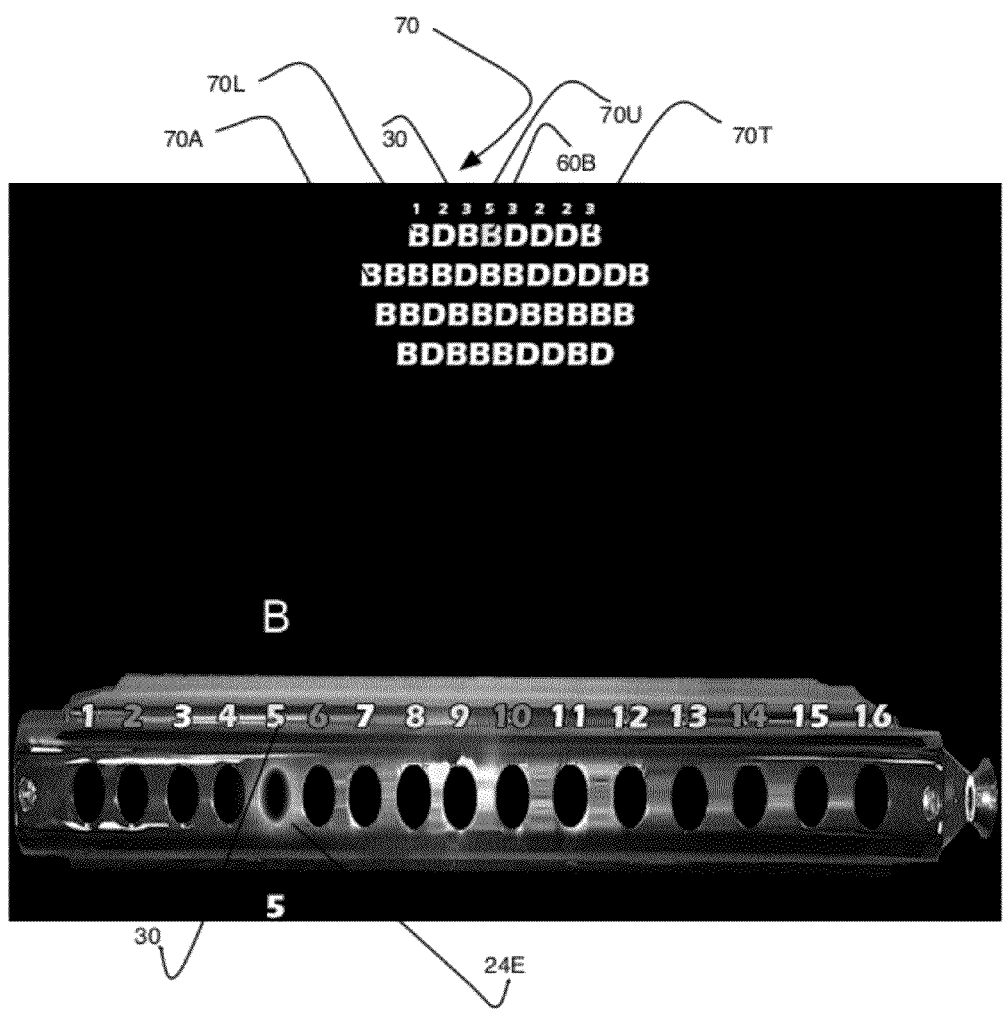
FIG. 6A is an exemplary display of a video screen of the invention in another embodiment, scrolling a display of a plurality of lines of the melody, progressing through the melody as it is played.

Additionally, as the user learns the sequence of a first note followed by a second note as described in FIG. 4A and FIG. 4B, the user needs to learn longer sequences in order to play a recognizable melody or song. As shown in FIG. 6A, the system shows in the video screen above the harmonica, a scrolling display of tabulature lines 70. Each tabulature line 70 presents a sequence of notes in a musical phrase, forming the melody and hence the song, is created by the sequence of phrases. The top line 70T in the display shows the phrase being attempted. A plurality of additional lines 70A below the 70T show the phrases to follow the top line 70T. As the top line 70T is completed, it scrolls away and disappears, the additional lines scrolling upward, a next additional line moving into position as the top line. In the tabulature notation of the method, the tabulature line 70 has two portions, an upper portion 70U displaying the sequences of number labels 30 for the holes and a lower portion 70L displaying the sequences of letter symbols for techniques, a letter symbol 60B matched to each number label 30 in the upper portion 70U. In a further embodiment, which is not shown, the lines are diatonic scale lines, the upper portion of the line displays the notes in diatonic scale notation over and each note matched with the letter symbol for technique in the lower portion. It is understood by those of ordinary skills that the demonstrated display of the tabulature lines above the harmonica is only one example of a display and that the tabulature lines can be placed in other positions on the screen relative to the harmonica, including below and along a side, within the inventive concept.

In FIG. 6A, the perimeter 24E and the number label 30 above hole 24 five (5) is displayed as bright and glowing, preferably displaying an assigned color, displaying the same color indicating the note being played. The letter symbol 60B in the lower portion 70L of the tabulature top line 70T representing the note being played glows and displays the assigned color, so that the user can easily determine the place in the sequence and can easily see the note that follows as well as the remaining notes in the phrase.

Figure 6B:
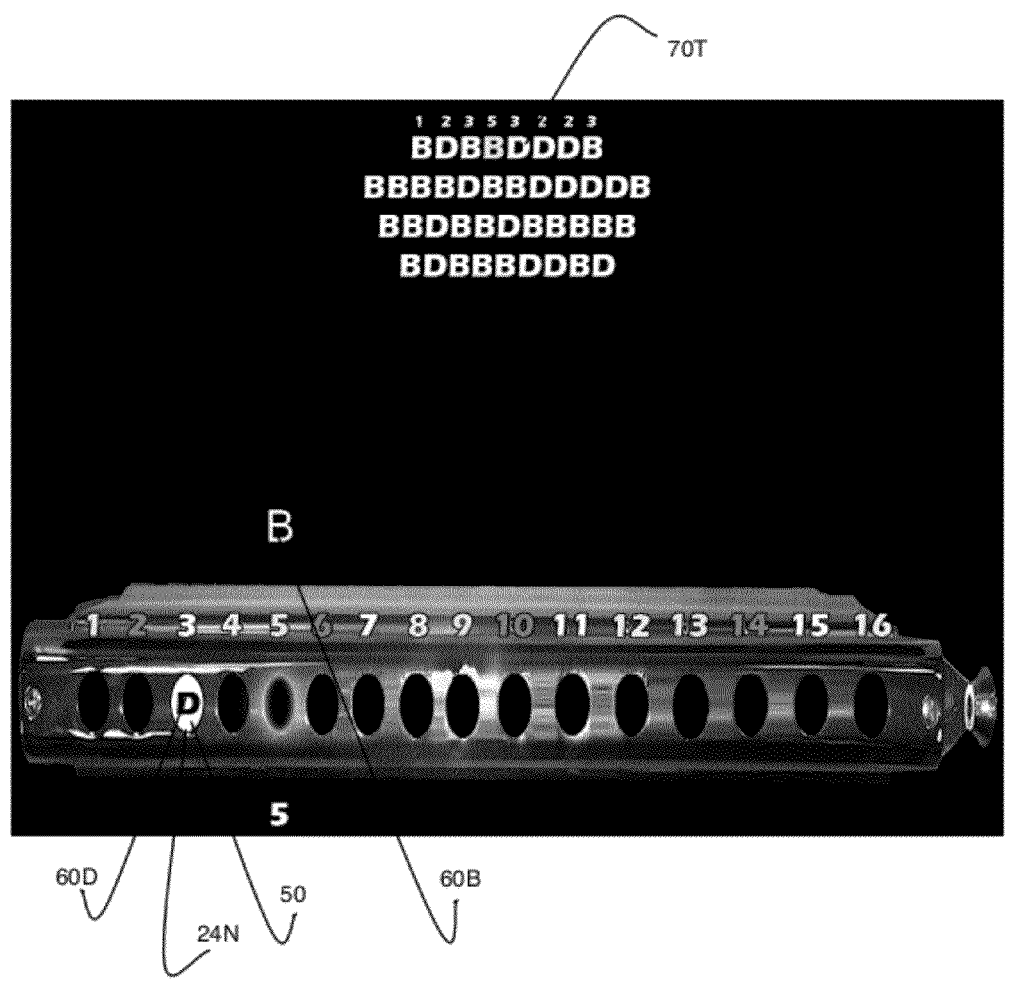
FIG. 6B, similar to FIG. 6A, is an exemplary display of a video screen of the invention scrolling a display of a plurality of lines of the melody, progressing through the melody as it is played, and indicating a next hole to be played by a white dot indicator with a letter symbol inscribed, showing how the next note is to be played.

In FIG. 6B, the user is alerted to the next note to be played by the dot indicator 50 in the next hole 24N, and in this embodiment, the letter symbol 60D for technique is displayed in the dot indicator 50 to prepare the user for the next note. Showing the dot indicator 50 for the next note reinforces for the user the sequence by the showing the note being sounded by the system by the bright and glowing letter symbol 60B and the next note displayed in the top line 70T of the tabulature lines, further enhancing the ability of the user to determine the place in the sequence of playing notes and anticipating the next note to be played.

It is well know that learning to play a song involves learning the melody, but also learning the meter or beat of the song, such as understanding a note value, that is how long a note is held. In a further embodiment, to teach the user how long a note is to be selectively held, FIG. 5 demonstrates how the system displays when to hold the note longer by enlarging the letter symbol 60E. The letter symbol remains enlarged for as long as the user is to hold the note.

Those of ordinary skill in the art will understand that the illustrative displays are to be interpreted in an exemplary manner and that displays different from those shown and described herein can be used within the scope of the present disclosure. For example, features of the displays can be combined, separated, interchanged, and/or rearranged to generate other displays.

It is understood that the letter "B" representing the technique of blowing air through the hole, the "B" standing for blow in the English language and "D" representing the technique of drawing air, standing for draw in English, are presented as non-limiting examples of letter symbols. It is further understood that the letter symbols are adaptable to any language and can use any letter, symbol or pictograph for blow or draw in the language of the user. In the examples throughout this discussion, a circle circumscribes the letter symbol when the system indicates to the user to press the slide button. It is further understood that the circle is a non-limiting example and the letter symbol can be inscribed by other shapes, such as, for example, a square, a triangle, a star, a cloud and other examples too numerous to mention.

Figure 10:
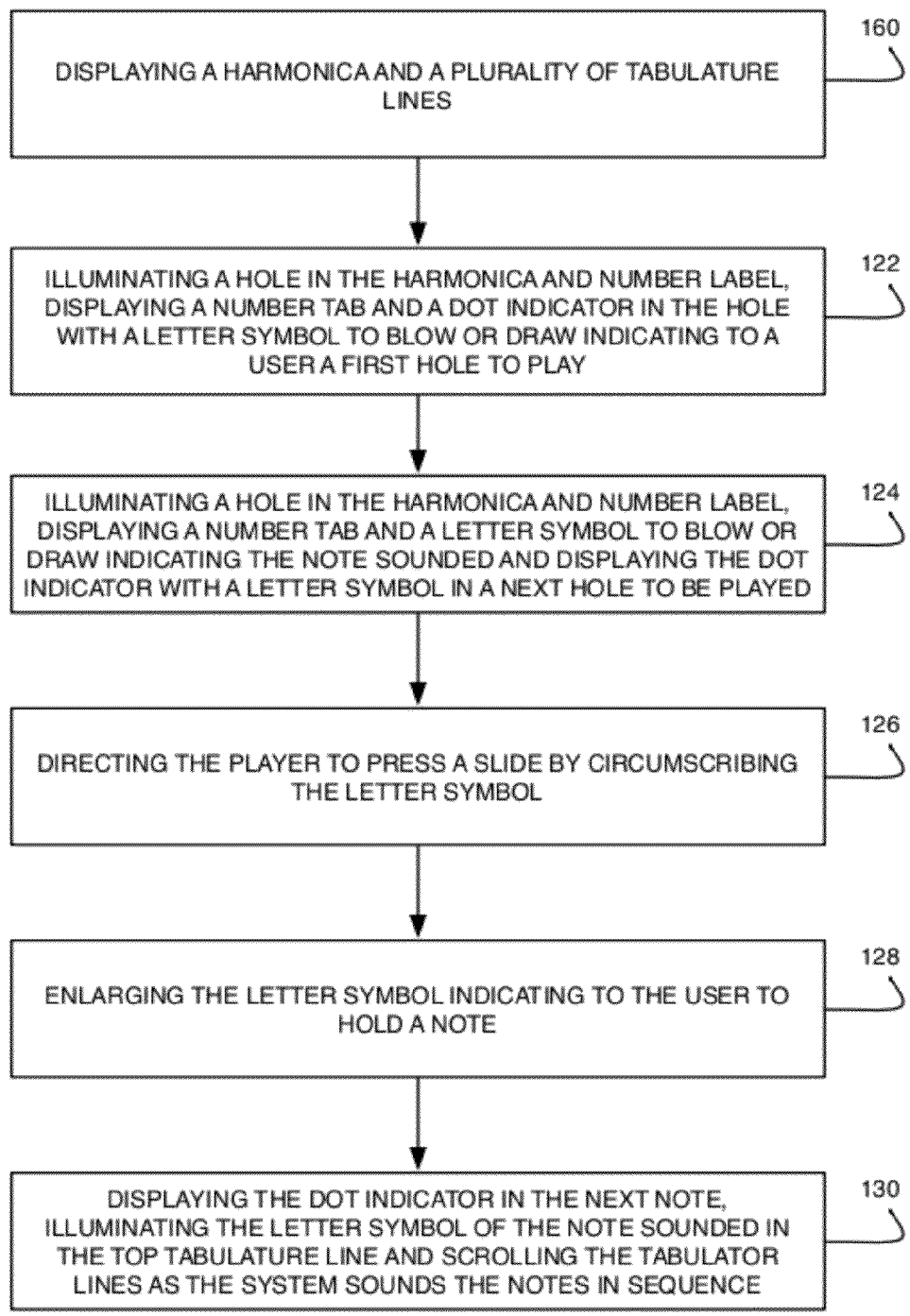
FIG. 10 is a flow chart of a plurality of steps performed by the multimedia application, teaching how to play the musical instrument.

Having explained the plurality of displays in the several embodiments of the system, FIG. 10 demonstrates a flow chart of how the system implements the method of instruction for the user in one embodiment on a personal computing device. The system initially displays the harmonica and a plurality of tabulature lines above the harmonica 102. To begin the melody for the user, the system selectively displays the dot indicator in a first hole, while illuminating the perimeter of the hole and the number label in the assigned color and selectively displaying the number tab below the hole, indicating to the user the first hole to play 122. The system displays the blow or draw letter symbol inside the dot indicator 122. The system displays the first hole while it is being sounded by maintaining the bright hole perimeter and the number label in the assigned color and displaying the blow or draw letter symbol above the hole and selectively displaying the dot indicator with the blow or draw letter symbol inside the indicator, indicating the next note to play 124. The system directs the user to press the slide button by circumscribing the letter symbol 126. The system indicates when to extend a note by enlarging the letter symbol, indicating how long to hold the note 128. The system continues selectively displaying the dot indicator in the next hole to be played while illuminating the hole currently being sounded, illuminating the letter symbol of the note in the top tabulature line in sequence scrolling the tabulature lines as the system sounds the notes of the melody and each line is completed 130.

The system operates on a cross-platform multimedia player application supporting a plurality of audio and video file formats and capable of playing multimedia files such as, for example, but not limited to, a DVD (digital versatile disc), audio and video compact discs (CD and VCD) streaming audio and video files from a network, electronically stored files on a drive, as well as other technologies both presently available and subsequently available, while adhering to the principles of the present invention. The cross-platform application operates on a plurality of devices, described hereinbelow and operating systems both presently known and subsequently available, such as for example, but not limited to, Microsoft Windows® (Registered trademark of Microsoft Corporation, Redmond Wash.), Mac OS® X (Registered trademark of Apple Computer, Inc. Cupertino Calif.) GNU, Linux, and iOS.

Figure 7A:
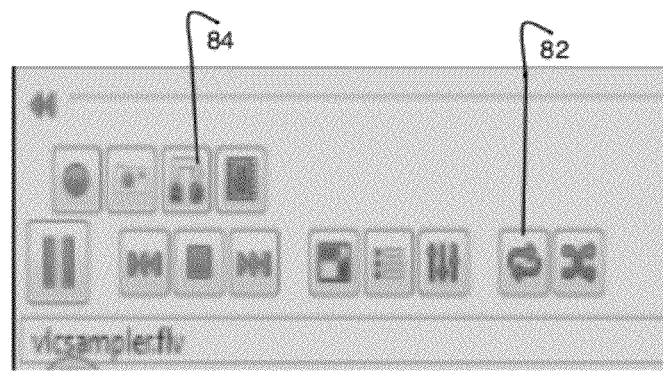
FIG. 7A is an enlarged exemplary display of a control panel for operating a multimedia application for teaching a musical instrument.
Figure 7B:
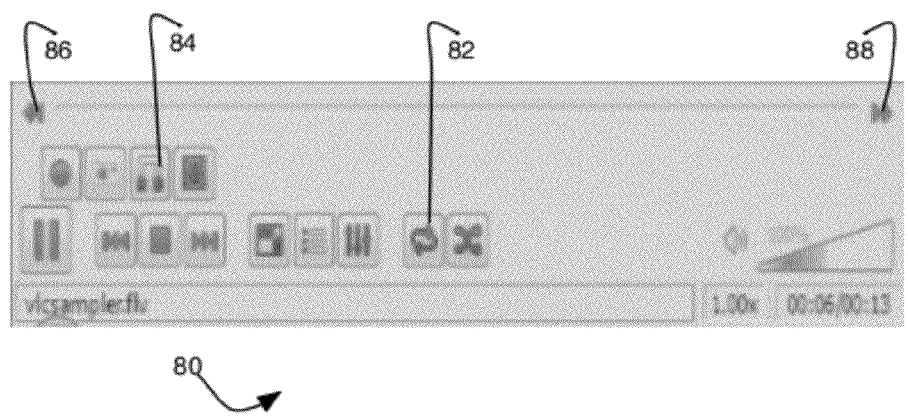
FIG. 7B, similar to FIG. 7A, is an exemplary display of the control panel for operating the multimedia application showing a pair of speed control icons.

Content of the method including the introduction to the harmonica, the melodies and the songs of instruction are stored in electronic files in machine-readable format. The player, with a plurality of control icons in an exemplary display 80 operating a plurality of functions for executing the system and playing the files, as shown in an exemplary display in FIG. 7A and FIG. 7B, is capable of creating a continuous loop of a file containing an entire melody through a loop icon 82, or selectively creating a phrase from the sequence of a plurality of notes for repeating in a loop 84 and slowing down 86 or speeding up 88 the playing of the file by selecting these icons. The functions as described above are selected to display the multimedia system and allow the user to adjust the display accordingly to enhance learning how to play the instrument. How the system and user employs the functions of the multimedia player is described hereinbelow.

Figure 9:
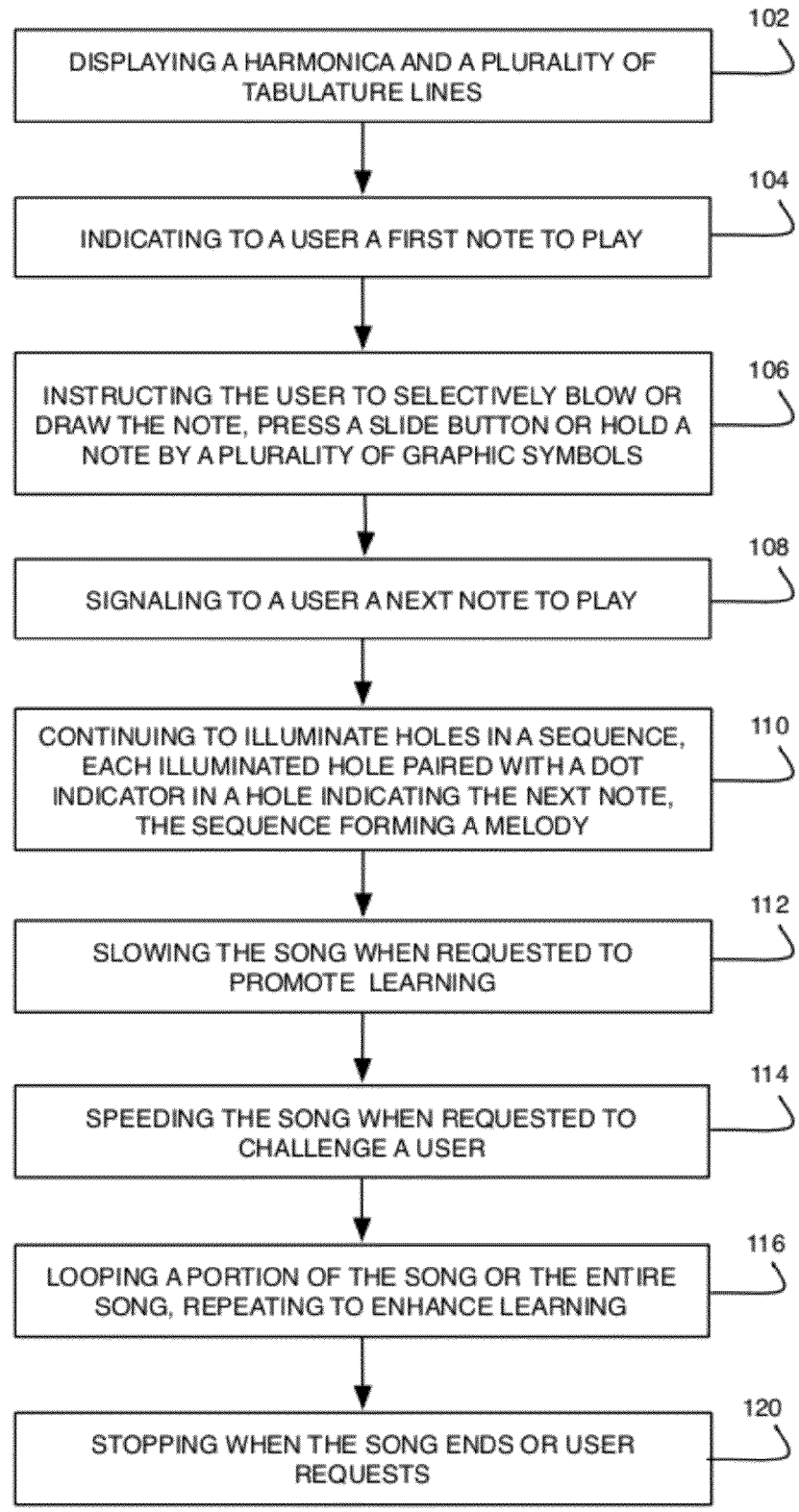
FIG. 9 is a flow chart of a plurality of steps performed by the multimedia application, teaching how to play the musical instrument in a sequence to produce a melody.

FIG. 9 demonstrates in a flow chart how the system presents a lesson to the user using the functions of the multimedia player to enhance the training of the user to play the harmonica. The system initially displays the harmonica and a plurality of tabulature lines above the harmonica 102. As explained in detail hereinabove, the system indicates to the user the first note to play 104. Along with indicating the first note to play, the system indicates how the technique to use, whether to blow or draw air or to press the slide button 106. The system signals the user the next note to play with the dot indicator as explained hereinabove 108.

The system continues to follow a melody as displayed in the tabulature lines as described hereinabove, illuminating a hole, displaying instructions for the technique needed to play the note, while displaying the dot indicator with the technique for the next note, forming the melody of the song 112. However, it is possible that the user finds a tempo presented by the system difficult to follow, especially when the user initially attempts to learn the instrument or to play a new song. The system, using the controls described above, allows the user to request slowing the tempo that the notes and instructions are presented 112. Conversely, as the user becomes familiar with the instrument or the song, the system allows the user to request speeding the tempo up, to challenge user and to enhance learning by providing a variety of tempos 114. If the user is having difficulty with a particular phrase in the sequence of notes, the user can select the phrase, using the multimedia player control icons as described above, and selectively loop the sequence to repeat, enabling the user to repeat and drill, enhancing the learning experience 116. Optionally, the user can select the entire song to loop repeatedly 116. The system stops at the end of the song, or if the song or the sequence is in a looping mode, when the player requests the playing of the loop to stop 120.

Figure 8A:
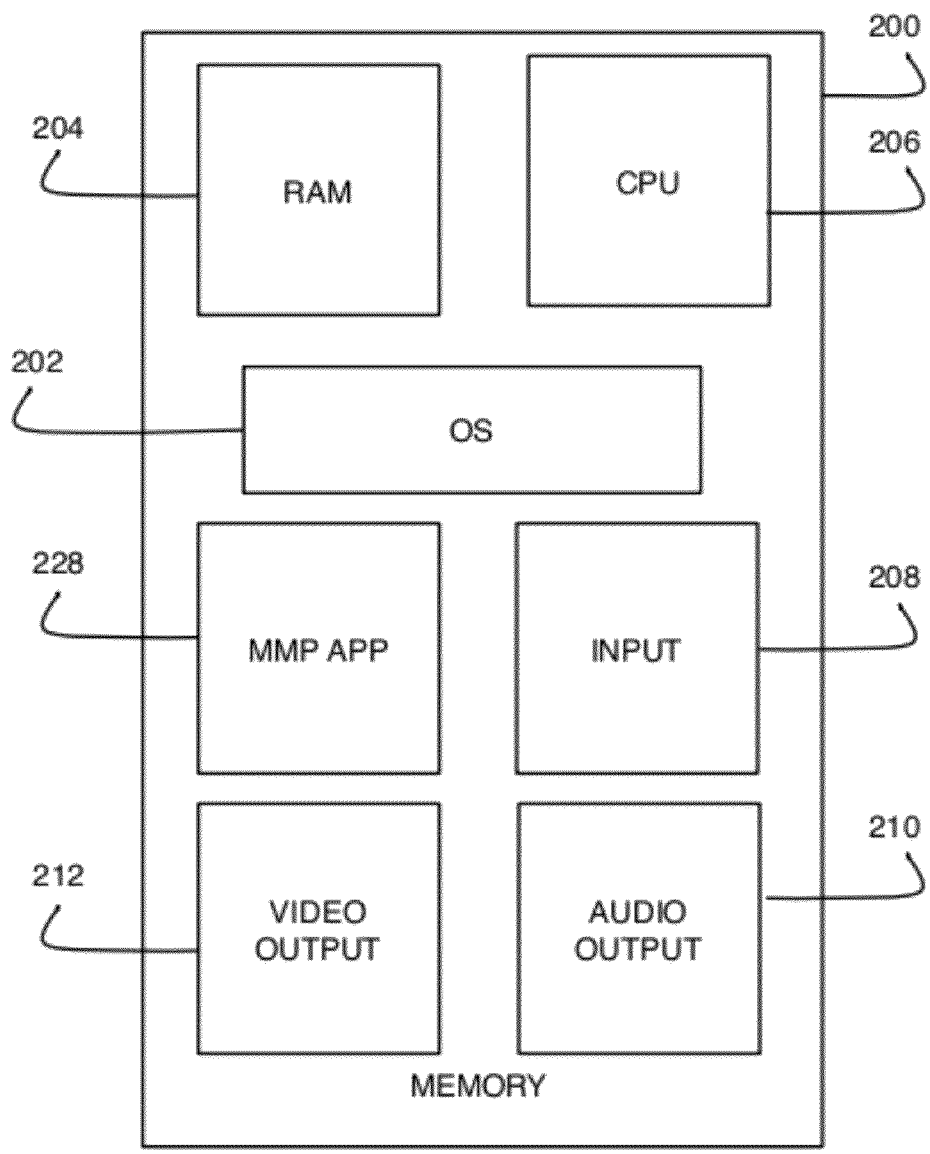
FIG. 8A is a block diagram of the multimedia application on a personal computing device.
Figure 8B:
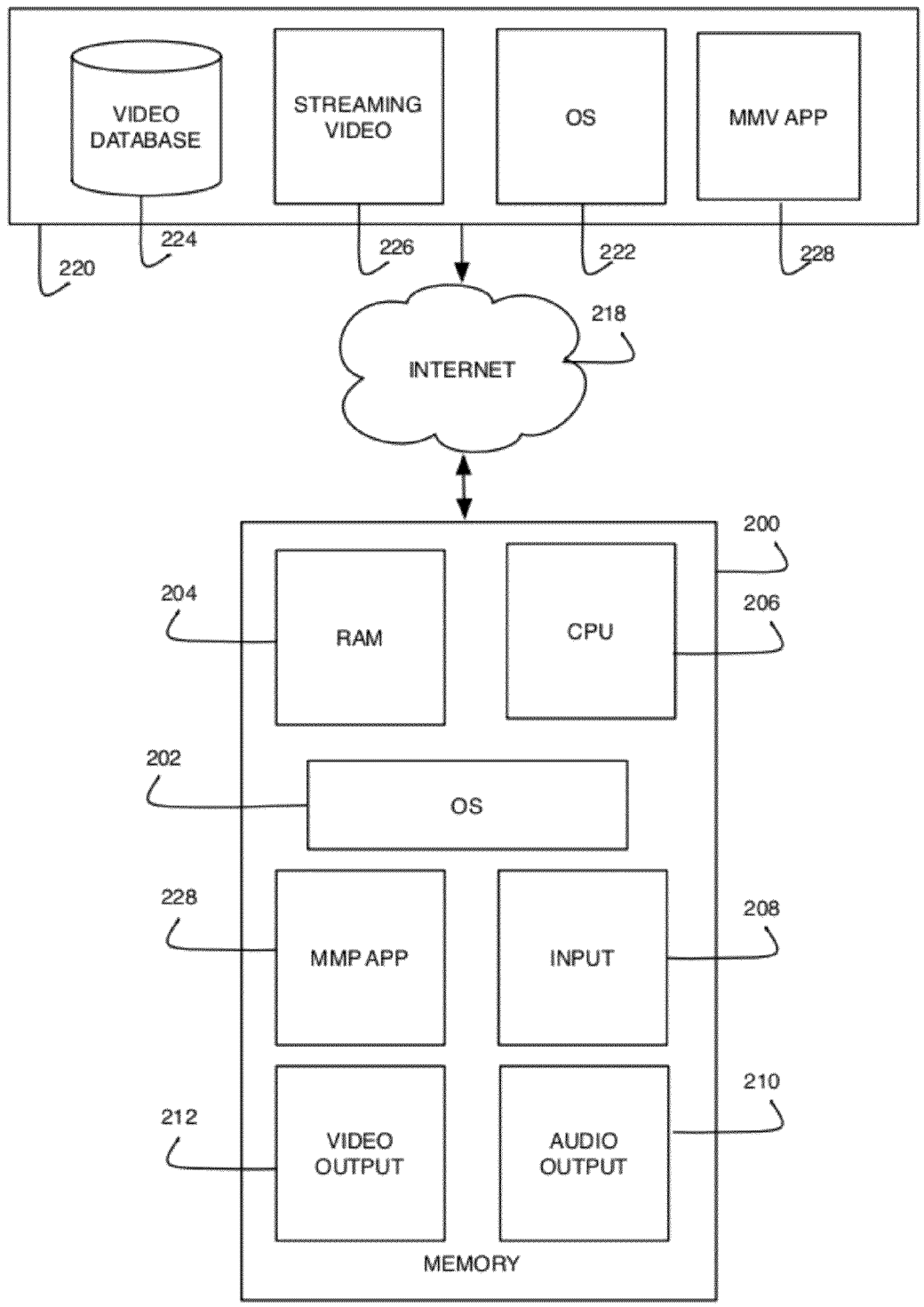
FIG. 8B, similar to FIG. 8A, is a block diagram of the multimedia application on a personal computing device connecting to a server for providing multimedia content to the application.

The system for the method of teaching the harmonica as described hereinabove in the various embodiments requires the multimedia player to execute the method and play the files of the method. In one embodiment, the multimedia player runs on a personal computing device 200, such as for example but not limited to, a desktop computer, a laptop computer, a netbook computer, a tablet computer, a smartphone, a personal digital assistant (PDA) as well as other personal computing devices both presently available and subsequently available. A block diagram in FIG. 8A shows the personal computing device having memory holding a central processing unit (CPU) 202, random access memory 204 for storing files of the system and an operating system (OS) 206. The operating system includes, but is not limited to, an operating system with communications software for connecting to a network, drivers and other software utilities necessary for the device to operate, which is well known to those of ordinary skill and the details of which are beyond the scope of this discussion. The device has an input means 208 for reading machine media and video output means 212 for to present the video displays of the files of the system and an audio output means 210 for sounding the files of the system. The device has the cross-platform multimedia player application (APP) 228 required to play the files of the system.

In a further embodiment, the personal computing device connects to a server 220 or a plurality of linked servers through the Internet 218. The server has an operating system 222 that includes, but is not limited to, an operating system with communications software for connecting to a network, drivers and other software utilities necessary for the server to operate, which is well known to those of ordinary skill and the details of which are beyond the scope of this discussion. The server has a database 224 of files of the system that the user downloads into RAM 206 as desired. Alternately, the user streams the file directly to the computing device over the Internet with a streaming audio-video application 226. In yet another example, the user runs the file on the multimedia player 228 on the server, often referred to as operating in the "cloud," the application residing on the server 220 and the application directly streaming video and audio output to the video output means 212 and audio output means 210 of the personal computing device 200.

Figure 11:
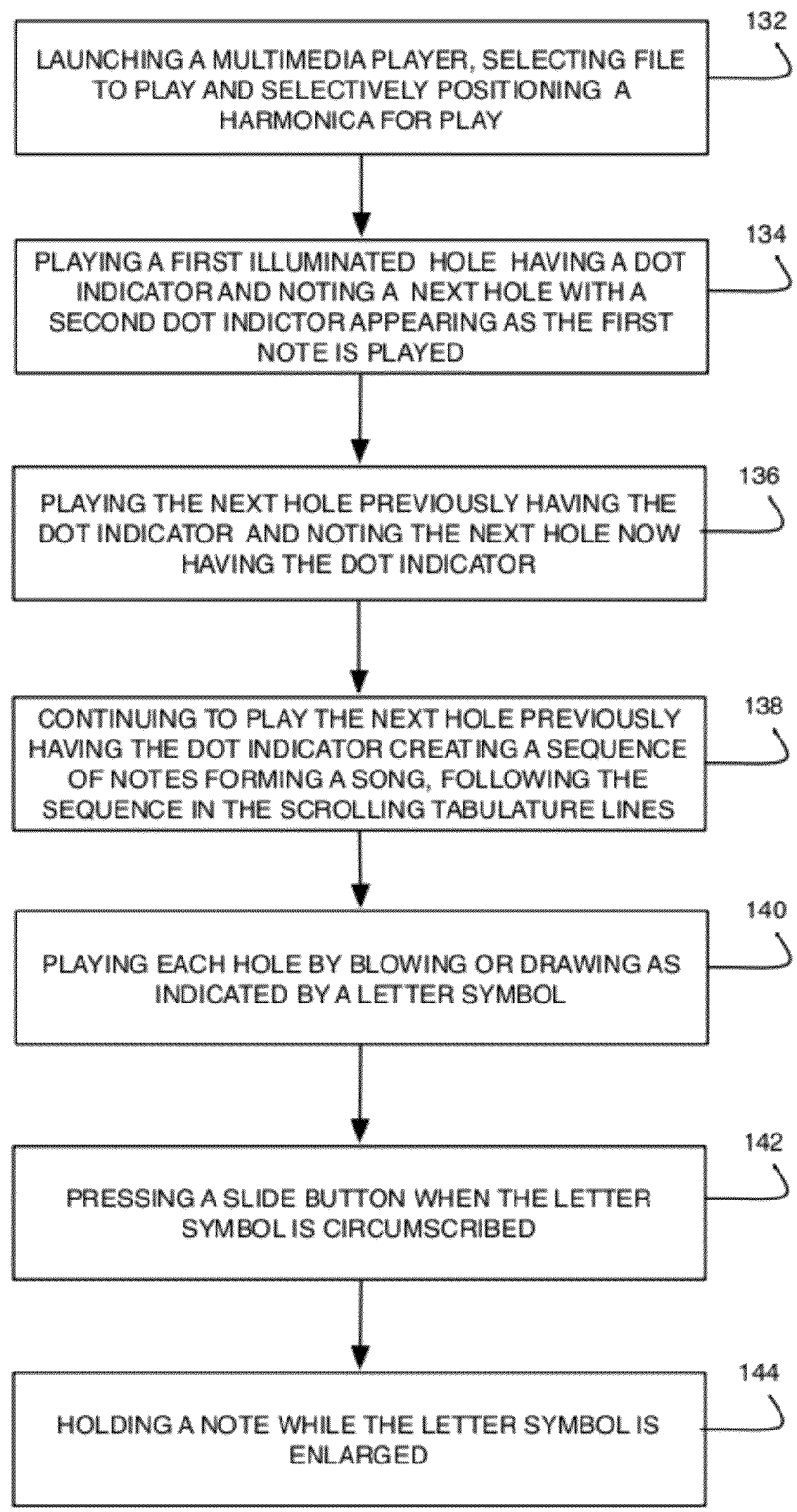
FIG. 11 is a flow chart of a plurality of steps performed by a student when learning how to play the musical instrument.

FIG. 11 demonstrates how a user engages the system, the user first launching the multimedia player and selecting a file to play, the user playing the file on a personal computing device as explained hereinabove, streaming to the personal computing device or playing the file directly on the multimedia player application on the device, or in the "cloud" 132. The user selectively positions the harmonica for playing to play along with a lesson presented by the system 132. The user plays the first hole, having the indicator dot and the hole perimeter illuminated, noting that the indicator dot changes as the note is played, indicating the next note to be played 134. The user plays the next note previously having the indicator dot, now having the illuminated perimeter and nothing the next hole having the dot indicator 136. The user continues to play the next hole as indicated, creating a sequence of notes forming a melody, while following the sequence displayed in the tabulature lines, easily noting the place in the sequence by the letter symbol in the tabulature line glowing with the same color with which the perimeter of the hole being played glows 138. The user plays each hole by blowing or drawing as indicated by the letter symbol 140, pressing the slide button when the letter symbol is circumscribed 142 and holding the note when the letter symbol is enlarged 144. The user continues in the manner described, using the multimedia player to selectively create repeating loops of the song or sequence or changing the tempo of play to enhance the learning experience.

The flowchart and block diagrams in the Figures illustrate the functionality and operation of possible implementations of systems, methods and software applications according to various embodiments of the present invention. In this regard, the functions noted in the block can occur out of the order noted in the figures. For example, two blocks shown in succession may, in fact, be executed substantially concurrently, such as blowing through the hole and pressing the slide button.

In conclusion, herein is presented a multimedia system and a method for introducing and teaching basic techniques and songs for playing the harmonica. The invention is illustrated by example in the drawing figures, and throughout the written description. It should be understood that numerous variations are possible, while adhering to the inventive concept. Such variations are contemplated as being a part of the present invention.

What is claimed is:

1. A method for teaching a user how to play a harmonica using a system having a multimedia player application on a personal computing device having an audio output and a video display, comprising:
displaying on the video output the harmonica having a plurality of holes, displaying concurrently a plurality of number labels, a number label identifying a hole, each hole having a number label;
displaying selectively on the video display a dot indicator on a first hole, indicating a first note to be sounded in a melody, a melody have a sequence of notes;
sounding the first note through the audio output, selectively showing the note being sounded by illuminating the first hole while indicating a next hole by displaying the dot indicator on the next hole;
sounding the next note through the audio output, showing the note being sounded by illuminating the sounding hole while indicating the next upcoming hole by the dot indicator; and
continuing to sound the notes in the sequence of the melody, illuminating the sounding hole while indicating the next hole with the dot indicator until the user selectively stops the application or the melody is complete.

2. The method for teaching how to play the harmonica as described in claim 1, wherein the number labels of the holes form a system of tabulature for playing the harmonica.

3. The method for teaching how to play the harmonica as described in claim 2, wherein the system further displays the tabulature in the sequence of notes of the melody in a plurality of lines in the video display.

4. The method for teaching how to play the harmonica as described in claim 3, wherein the lines of number labels have a top line and at least one additional line, the top line illuminating the note being sounded in the sequence, the top row disappearing when all the notes in the line have been sounded, the next additional line becoming the top line so that the user easily tracks the notes being sounded.

5. The method for teaching how to play the harmonica as described in claim 1, wherein the video display indicates a technique of playing the note by a letter symbol.

6. The method for teaching how to play the harmonica as described in claim 5, wherein the letter symbol indicates when to use the technique of selectively blowing air through the hole.

7. The method for teaching how to play the harmonica as described in claim 5, wherein the letter symbol indicates when to use the technique of selectively drawing air through the hole.

8. The method for teaching how to play the harmonica as described in claim 5, wherein the video display shows the letter symbol associated with the number label of the note as the note is being sounded.

9. The method for teaching how to play the harmonica as described in claim 5, wherein the video display shows the letter symbol inside the dot indicator showing the technique for playing the next hole when indicating the next hole to be played.

10. The method for teaching how to play the harmonica as described in claim 5, wherein the harmonica has a slide button and the video display shows the letter symbol circumscribed with a shape, indicating the user presses the button when the note is played.

11. The method for teaching how to play a harmonica as described in claim 1, wherein the user chooses a phrase from the sequence of notes in the melody and selectively repeats the phrase at least once, creating a loop for a practice drill.

12. The method for teaching how to play a musical instrument as described in claim 1, wherein the user changes the speed of sounding the notes and displaying the next note.

13. A method for teaching a user how to play a musical instrument using a system having a multimedia player application on a personal computing device having an audio output and a video display, comprising:

displaying on the video display the musical instrument having a plurality of elements, displaying concurrently a plurality of number labels, a number label identifying an element of the musical instrument, each element having a number label;

displaying selectively on the video a dot indicator on a first element, indicating a first note to be sounded in a melody, a melody have a sequence of notes;

sounding the first note through the audio output, selectively showing the note being sounded by a visual display while indicating a next element by displaying the dot indicator on the next element; and sounding the next note through the audio output, showing the note being sounded by a visual display while indicating the next upcoming note of the melody by the dot indicator; and continuing to sound the notes in the sequence of the melody, visually displaying the sounding element while indicating the next element with the dot indicator until the user selectively stops the application or the melody is complete.

14. The method for teaching how to play the musical instrument as described in claim 13, wherein the system further displays on the video display the number labels of the instrument elements in a sequence in a plurality of lines indicating the notes of the melody.

15. The method for teaching how to play the musical instrument as described in claim 14, wherein the lines of number labels has a top line, the top line indicating the note being sounded in the sequence, the top line disappearing when all the notes in the line have been sounded, a next line becoming the top line so that the user easily tracks the notes being sounded.

16. The method for teaching how to play the musical instrument as described in claim 13, wherein the video display indicates a technique of playing the note by a letter symbol.

17. The method for teaching how to play the musical instrument as described in claim 16, wherein the letter symbol indicating the technique of playing the first note accompanies the number label of the note as the note is being sounded.

18. The method for teaching how to play the musical instrument as described in claim 17, wherein the video display shows the letter symbol inside the dot indicator showing the technique for playing the next element when indicating the next element to be played.

19. The method for teaching how to play the musical instrument as described in claim 13, wherein the user chooses a portion of the sequence of notes in the melody and repeats the portion at least once, creating a loop for a practice drill.

20. The method for teaching how to play the musical instrument as described in claim 13, wherein the user changes the speed of sounding the notes and displaying the next note.

21. A system for teaching how to play a musical instrument, the system having a multimedia player application operating on a personal computing device, the device presenting an audio output and a video display, comprising:

an electronic file, the file executable by the multimedia player application;

a video display produced by executing the electronic file, the video display showing the musical instrument, the instrument having a plurality of elements, each element illuminated in the video display as it is sounded;

a plurality of number labels in the video display, a number label identifying an element of the musical instrument, each element having a number label;

a dot indicator selectively displaying on a first element in the video display, indicating a first note to be sounded, the dot indicator selectively moving to a next note to be sounded as the first note is sounded;

a letter symbol displaying on the element, indicating a technique to play the element when a note is sounded;

an audio output, selectively sounding the first note indicated by the dot indicator and the next note on the next element indicated by the dot indicator and continuing to sound the notes in a sequence indicated by the dot indicator selectively moving to the next note, each element illuminating as it is sounded, teaching the user how to play the musical instrument to produce a song.

* * * * *